(12) United States Patent
Russell-Clarke et al.

(10) Patent No.: US 8,994,608 B2
(45) Date of Patent: Mar. 31, 2015

(54) COMPOUND PARTS

(75) Inventors: Peter N. Russell-Clarke, San Francisco, CA (US); Michael K. Pilliod, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 252 days.

(21) Appl. No.: 13/620,142

(22) Filed: Sep. 14, 2012

(65) Prior Publication Data

US 2014/0076731 A1    Mar. 20, 2014

(51) Int. Cl.
| | | |
|---|---|---|
| H01Q 1/40 | (2006.01) | |
| H01Q 1/24 | (2006.01) | |
| C25D 5/02 | (2006.01) | |
| B29C 45/14 | (2006.01) | |
| B29C 39/22 | (2006.01) | |
| B29C 39/10 | (2006.01) | |
| B29C 35/02 | (2006.01) | |

(52) U.S. Cl.
CPC *B29C 39/22* (2013.01); *H01Q 1/40* (2013.01); *B29C 35/02* (2013.01); *B29C 39/10* (2013.01)
USPC ............. 343/873; 343/702; 205/118; 29/530; 264/267

(58) Field of Classification Search
CPC .................. H01Q 1/40; H01Q 1/243

USPC .......................................... 343/872, 873, 702
See application file for complete search history.

(56) References Cited

U.S. PATENT DOCUMENTS

| | | | |
|---|---|---|---|
| 6,967,138 B2 | 11/2005 | Ding | |
| 2002/0093457 A1* | 7/2002 | Hamada et al. ............... | 343/702 |
| 2007/0284565 A1 | 12/2007 | Leatherdale et al. | |
| 2009/0281251 A1 | 11/2009 | Bae et al. | |
| 2010/0245184 A1 | 9/2010 | Talty et al. | |
| 2011/0006953 A1 | 1/2011 | Chiang et al. | |
| 2011/0043987 A1 | 2/2011 | Das et al. | |
| 2012/0127040 A1 | 5/2012 | Tang et al. | |

FOREIGN PATENT DOCUMENTS

JP    2011089530    6/2011

OTHER PUBLICATIONS

PCT/US2013/056041. Int'l Search Report & Written Opinion (Nov. 27, 2013).

\* cited by examiner

*Primary Examiner* — Robert Karacsony
(74) *Attorney, Agent, or Firm* — Womble Carlyle Sandridge & Rice LLP

(57) ABSTRACT

A method for manufacturing a compound part comprises preparing a cavity in a receiving part, selecting a resin for application in the receiving part, applying the resin into the cavity, curing the applied resin, and simultaneously finishing the receiving part and the cured resin.

23 Claims, 5 Drawing Sheets

COMPOUND PARTS

FIELD OF THE DESCRIBED EMBODIMENTS

The described embodiments relate generally to personal electronic devices, and more particularly, to materials for forming compound parts including, for example, radio transparent or substantially radio transparent antenna windows.

BACKGROUND

Conventionally, antennas of personal electronic devices are covered using a plastic material or rubber which allows for transmission of radio waves. The plastic material may be of a substantially different look and feel than a remaining portion of the device. For example, if a device is encased in a metallic material (e.g., aluminum or stainless steel), the plastic material covering the antenna may be of a different look, feel, texture, weight, and may detract from the overall aesthetics of the device.

Furthermore, plastic materials used as described above may not be acceptably tolerant to high temperature and/or chemicals. Therefore, when preparing and processing a housing for the electronic device, any plastic material used in the external covering is applied after all significant processing of the housing takes place. For example, if the housing is formed of a metallic material, the metallic material must be milled, cast, or otherwise formed, and subsequent to multiple heat processing or coating steps, prepared to receive the noted plastic material. If the plastic material is applied prior to any significant processing, the plastic material may bulge, melt, deform, discolor, and/or otherwise be damaged.

As such, what is desired are materials for forming compound parts, such as housings for electronic devices, which may allow for substantial transmission and receipt of radio waves while also allowing for simplified processing which results in significant advantages in maintaining intended aesthetics for the compound parts.

SUMMARY OF THE DESCRIBED EMBODIMENTS

This paper describes various embodiments that relate to compound parts useful in the manufacture of personal electronic devices.

According to one exemplary embodiment of the present invention, a method for manufacturing a compound part includes preparing a cavity in a receiving part, selecting a resin for application in the receiving part, applying the resin into the cavity, curing the resin, and simultaneously finishing the receiving part and the cured resin.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION OF SELECTED EMBODIMENTS

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Figure 1:
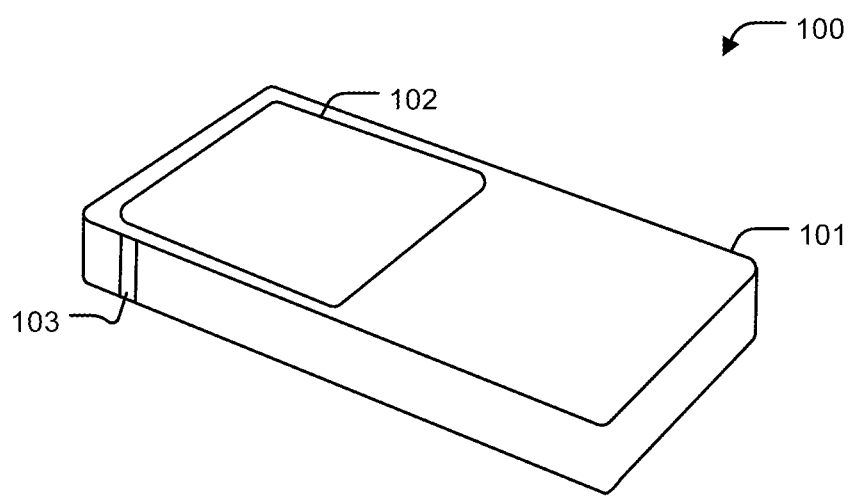
FIG. 1 is a perspective view of a compound part, according to an exemplary embodiment of the present invention.

Turning to FIG. 1, a perspective view of a compound part 100 is illustrated. The compound part 100 may be a device housing, frame, exterior, or other suitable part. The compound part 100 includes a main body 101. The main body 101 may be formed of any suitable material, including, for example, aluminum or stainless steel. As shown, the main body 101 includes one or more filled cavities 102, 103. The filled cavities 102, 103 may be filled with a cured resin which was simultaneously finished with the main body 101.

For example, the resin may include a base resin and filler material cured during manufacture of the compound part 100. Upon finishing, the filled cavities 102, 103 and the main body 101 present a compound part with a particular aesthetic which is generally stable throughout different manufacturing processes due to the cooperation of the base resin and filler material. Several different forms of both the base resin and filler material are presented herein with reference to FIG. 1 and FIGS. 2-5 to aid in understanding both the finished compound part 100 and the process of manufacturing the compound part 100.

Figure 2:
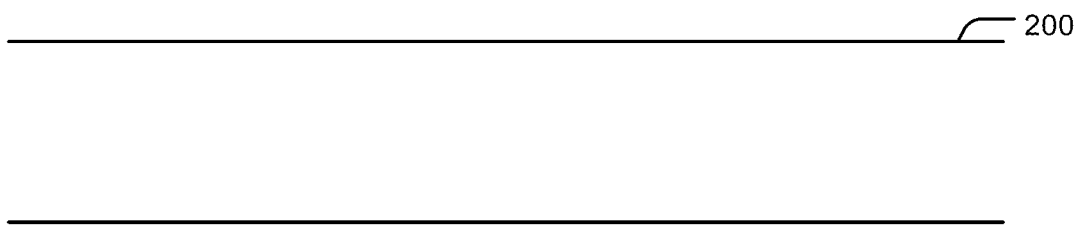
FIG. 2 illustrates a portion of a method of manufacturing a compound part, according to an exemplary embodiment of the present invention.

Turning to FIG. 2, a portion of a method of manufacturing a compound part is illustrated. As shown, a main body 200 of a receiving part is illustrated. The main body may be an unfinished portion of a personal electronic device, for example, such as a housing or casing configured to receive a plurality of electronic components. The main body 200 may be formed of any suitable material. According to one exemplary embodiment, the main body 200 is formed of aluminum or an aluminum alloy. According to another exemplary embodiment, the main body 200 is formed of stainless steel. According to other exemplary embodiments, the main body 200 is formed of glass, ceramic, or carbon fibre.

The main body 200 may include a plurality of additional features not illustrated for simplicity and for the sake of brevity. For example, the plurality of additional features may include internal cavities configured to receive and support electronic components or other suitable or desirable features. Generally, an outer surface of the main body 200 may be unfinished or partially finished, for example, requiring at least one additional processing step prior to final finishing of a final prepared device.

Turning to FIG. 2, another portion of a method of manufacturing a compound part is illustrated. As shown, a cavity 201 may be formed in the main body 200. The cavity 201 may be configured to receive a resin material as described above with reference to FIG. 1. For example, the resin material may include a base resin and a filler material. According to any particular characteristics of a cured resin material, the cavity 201 may be formed with one or more retention formations 202, 203 to increase mechanical stability of a finished compound part. The retention formations 202, 203 may include slots, keying, or other mechanical structures configured to structurally support cured resin material and prevent dislocation of the material in a finished compound part.

According to one exemplary embodiment, the retention formations 202, 203 include a plurality of slots configured to receive a portion of resin material and support the same. According to other exemplary embodiments, the retention formations 202, 203 include mechanically altered surfaces of an interior of the cavity 201, for example, through bead blasting, sand blasting, metal etching or other alterations configured to increase adhesion of resin material to surfaces of the cavity 201. It is noted that the same may be combined together such that mechanical alteration of surfaces of the cavity 201 and slots are both included to further enhance mechanical stability of a finished compound part. Furthermore, additional processing may be performed alternatively or in combination with the above described steps. For example, structural components such as brackets or frames may be included within or proximate to cavity 201 to interact with and adhere to applied resin material.

Figure 3:
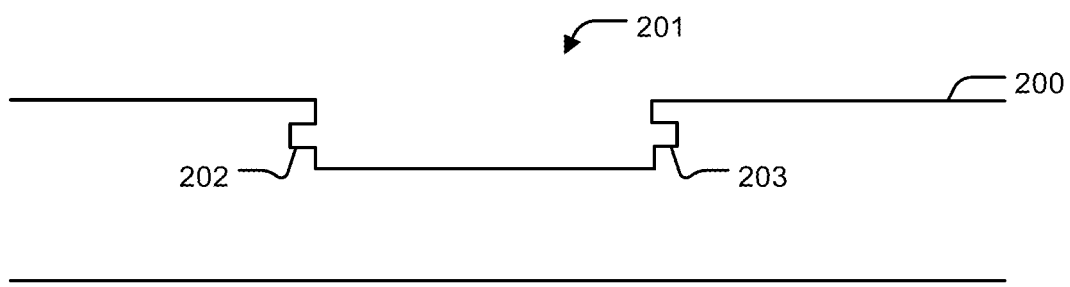
FIG. 3 illustrates a portion of a method of manufacturing a compound part, according to an exemplary embodiment of the present invention.
Figure 4:
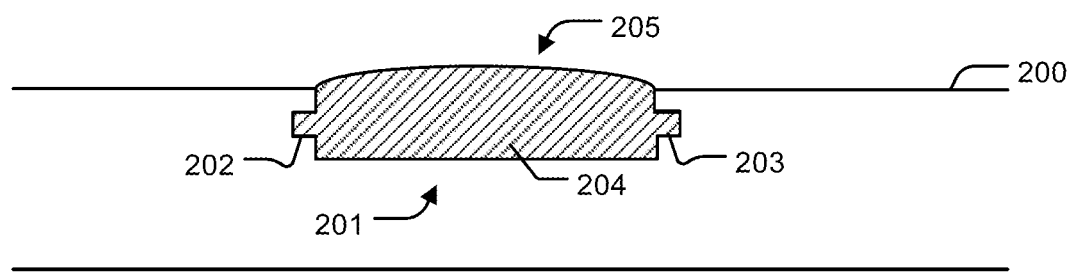
FIG. 4 illustrates a portion of a method of manufacturing a compound part, according to an exemplary embodiment of the present invention.

Turning to FIG. 3, another portion of a method of manufacturing a compound part is illustrated. As shown, a resin material 204 may be applied to the cavity 201 and cured. The cured resin may include a protruding surface 205 due to excess resin material applied to ensure full engagement with surfaces of the cavity 201.

The resin material 204 may include any desired material configured to withstand one or more additional processing steps in the manufacture of a compound part. According to one exemplary embodiment of the present invention, the resin material 204 may include a base resin and a filler material. The base resin may include any suitable base resin, including, but not limited to, an acrylate-based resin, an anhydride-based resin, a cationic-based resin, thermosetting polymers, or any other suitable resin materials.

Acrylate-based resins may include resins based on acrylate chemistries and similar compounds configured to be impregnated with a filler material and cured subsequently.

Anhydride-based resins may include resins based on anhydride chemistries such as epoxies or glues configured to be impregnated with a filler material and cured subsequently.

Cationic-based resins may include resins based on cationic chemistries and similar compounds configured to be impregnated with a filler material and cured subsequently.

Thermosetting polymers may be based on any of the chemistries noted above, configured to be cured through heat processing.

As noted above, the resin material 204 may include both the base resin and filler material. The filler material may include any suitable filler material, including, but not limited to, nano-sized particles or nano-particles, suspended heat-activated chemistries, ceramics or porcelains, or any other suitable filler materials which maintain at least a portion of radio transparency of the base resins noted above. The filler material may be uniformly suspended in any of the base resins noted above at a volumetric ratio of about 70 percent volume base resin to 30 percent volume of filler material. The filler material may also be mixed with base resin according to increasing or decreasing formulations for altering mechanical characteristics of the cured resin material 204 depending upon a physical location in relation to the cavity 201. For example, a volumetric ratio of base resin to filler material may be based on an increasing or decreasing gradient in relation to distance from an edge or perimeter of the cavity 201. Therefore, more or less filler material may be used according to physical distance of the edges of the cavity. In this manner, outer edges of cured resin material 204 may be made more or less ductile than interior portions. Additional chemistries and formulations may be added to the resin material 204 to increase or enhance its benefits in use with compound parts. For example, impact modifiers such as rubberized particles may be added to increase strength or resistance to impact.

As noted above, the resin material 204 may be cured subsequent to application in the cavity 201. According to exemplary embodiments of the present invention, the cured resin material 204 may be temperature and chemically resistant to a plurality of typical processes used in device fabrication. For example, the cured resin 204 may be resistant to temperatures up to and above about 130° C. Generally, this temperature resistance of a cured resin may be more beneficial than any apparent disparity between coefficients of thermal expansion of the resin material 204 and the main body 200. As such, material chemistries displaying this temperature resistance may be chosen more readily from a group of proposed resin formulations than other materials with expansive properties similar to the main body 200 but with less temperature resistance. Upon curing the resin material 204 within the cavity 201, the entire assembly may be further processed as described below.

Figure 5:
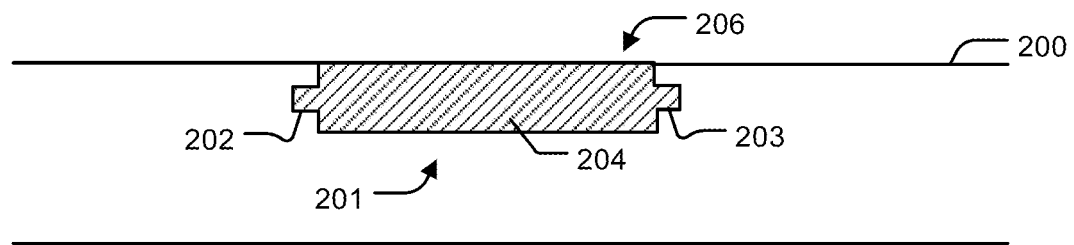
FIG. 5 illustrates a portion of a method of manufacturing a compound part, according to an exemplary embodiment of the present invention.

Turning to FIG. 5, an additional portion of a method of manufacturing a compound part is illustrated. As shown, the main body 200 and resin material 204 may be simultaneously finished, for example, through mechanical or chemical processing or any combination thereof. According to one exemplary embodiment, an outer surface of the resin material 204 may be milled simultaneously with an outer surface of the main body 200 to form a uniform surface 206 with little or no seams or transitional height differences between the two unique portions of a compound part. Furthermore, the uniform surface 206 may be further processed, for example, through heat processing, chemical application, passivation, or other techniques such that both the resin material 204 and main body 200 are processed simultaneously.

Due to the mechanical qualities noted above of the resin material 204, little or no dislocation, bulging, shrinking, or other disturbances to the uniform surface 206 may be apparent in this additional processing. The relatively high temperature resistance of the cured and milled resin 204 may allow for unique processing to further enhance the aesthetic qualities of a finished device, for example, through passivation or anodization processes and/or bead or sand blasting and/or hardcoating and/or polishing and/or other surface finishing techniques.

Furthermore, chromatic qualities of the filler material may allow for unique coloration combinations which are resistant to discoloration during additional processing, or that may allow chemical washing processes to reduce discoloration in subsequent processing.

Hereinafter, the method steps described above are presented in full with reference to FIGS. 6-7.

Figure 6:
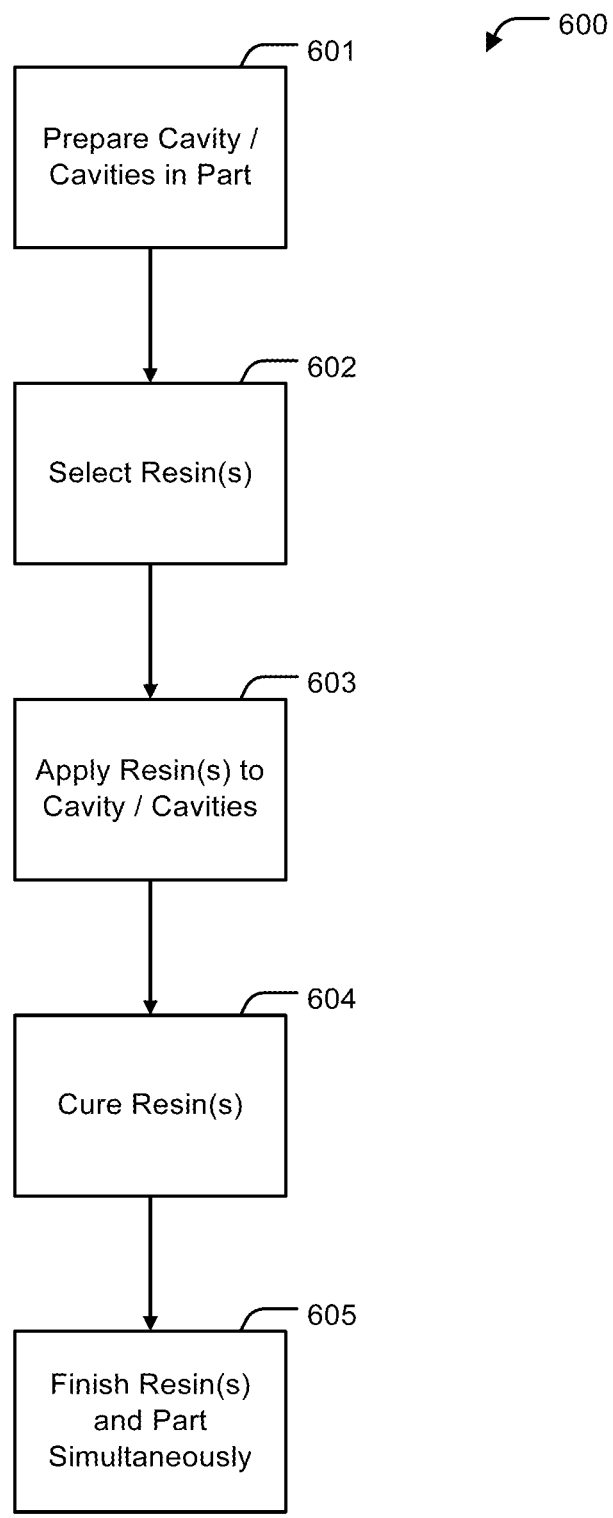
FIG. 6 is a flowchart of a method of manufacturing a compound part, according to an exemplary embodiment of the present invention.
Figure 7:
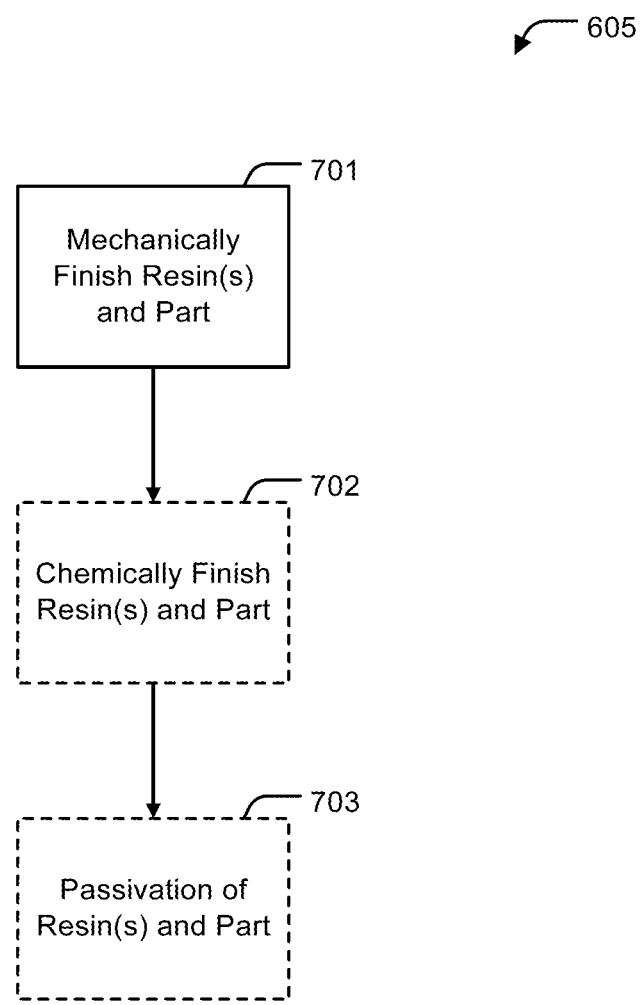
FIG. 7 a flowchart of a method of finishing a compound part, according to an exemplary embodiment of the present invention.

Turning to FIG. 6, a flowchart of a method 600 of manufacturing a compound part is illustrated. The method 600 includes preparing at least one cavity in a receiving part at block 601. Preparing the cavity may include mechanically milling one or more cavities in a main body of the receiving part. Preparing the cavity may further include surface preparation of surfaces of the cavity to increase adhesion of a resin material to the cavity. Surface preparation may include etching or otherwise altering the surface to increase adhesion. The prepared cavity may include one or more mechanical support structures arranged therein, such as retention formations 202, 203, framing or other supportive members configured to support and retain cured resin material.

The method 600 further includes selecting one or more resin materials for application in the prepared cavity at block 602. Selecting the resin materials may include selecting one or more base resins and one or more filler materials. Selecting the resin materials may include determining temperature resistance of a cured form of a group of proposed base resins and selecting a resin with a high temperature resistance. If a particular opacity is desired of the cured resin, the selecting may includes determining opacity of a cured form of a group of base resins and filler materials, and selecting a base resin and filler material based on the determination. Base resins may include any suitable base resin, including, but not limited to, an acrylate-based resin, an anhydride-based resin, a cationic-based resin, thermosetting polymers, or any other suitable resin materials. The filler material may include any suitable filler material, including, but not limited to, nano-sized particles or nano-particles, suspended heat-activated chemistries, ceramics or porcelains, or any other suitable filler materials which maintain at least a portion of radio transparency of the base resins noted above.

The resin materials may be chosen such that cured properties of the resin have relatively high temperature resistance and/or chemical processing resistance. Relatively high temperature resistance may be resistance to temperatures at or above 130° C. Chemical processing resistance may be resistance to discoloration due to exposure to a particular set of processing chemistries. The processing chemistries may include chemistries applied to the receiving part during surface passivation or anodization, such as, for example, electrolytic chemistries.

The method 600 further includes applying the selected resin materials to the prepared cavity or cavities at block 603. Applying the resin material may include dispensing the resin material with a nozzle into the cavity and overfilling to promote fully populating a cavity with the resin material. Applying the resin material may also include vibrating or mechanically perturbing the receiving part to reduce or eliminate voids, bubbles, or other nuisance features of the resin material either before, during, after dispensing or in combination. If the base resin material includes a two-or-more part hardening system, for example, through use of two or more cooperating chemistries, these chemistries may be mixed within a mixing nozzle during dispensing or may be mixed prior to dispensing within a hardening time window to ensure the resin material is dispensed before chemical hardening is apparent.

The method 600 further includes curing the dispensed resin material at block 603. Curing the dispensed resin material may include thermally curing the material, for example, through exposure in a reaction chamber or curing furnace. The curing may include elevating the temperature of the receiving part and dispensed resin material until the dispensed resin material is fully cured or set.

The method 600 further comprises simultaneously finishing the receiving part and the cured resin at block 605. The simultaneous finishing may include milling an outer surface of the cured resin and an outer surface of the receiving part to form a uniform surface with little or no seams or transitional height differences between two unique portions of a compound part. Furthermore, the uniform surface may be further processed, for example, through heat processing, chemical application, passivation, or other techniques such that both the cured resin and receiving part are processed simultaneously. Simultaneous finishing is described more fully below with reference to FIG. 7.

As illustrated, the simultaneous finishing 605 may include mechanically finishing the cured resin and the finished part at block 701. The mechanical finishing may include milling, drilling, sand or bead blasting or other suitable mechanical finishing techniques. The simultaneous finishing 605 may also include chemical finishing of the cured resin and the receiving part at block 702. Chemical finishing may include surface etching, coatings, painting, or other finishing, and may be optional depending upon any desired aesthetics of a finished compound part. The simultaneous finishing may further include passivation of the receiving part and cured resin at block 703. Passivation may include an anodizing process whereby a chemistry is applied to surfaces of the receiving part and the cured resin to promote growth of a thin oxide passivation layer on the receiving part during subsequent temperature processing.

As described above, various embodiments providing manufacturing and processing technique for compound parts are presented herein. The compound parts may include at least one cavity filled with a cured resin material. The cured resin material may be radio transparent or substantially radio transparent, and may be finished simultaneously with a receiving part of the final compound part. Although particularly described as relating to radio transparency, it should be appreciated that the same may be varied in many ways for the manufacture of a plurality of different compound parts including decorative inlays or features, decorative indicia such as lettering or numbering, decorative logos or graphical inlays, watch or clock numbers on a watch or clock face, or other variations. Additionally, the chromatic properties including coloring may be altered through use of varying filler materials and chemistries. Additionally, luminous transparency may be altered such that the filled cavities are opaque or substantially opaque, or transparent or translucent, depending upon any desired implementation of exemplary embodiments.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. An electronic device, comprising:
   a housing having a cavity defined by a retaining surface, the retaining surface having at least one retention feature; and
   a radio frequency (RF) transparent window comprising a composite resin formed within the cavity and co-finished with the housing providing a seamlessly appearing transition between the RF transparent window and the housing, the RF transparent window configured to allow transmission of RF wavelengths to pass therethrough, the RF transparent window having at least one securing feature engaged with corresponding at least one retention feature securing the RF transparent window within the cavity, the composite resin comprising a plurality of discrete particles suspended within a resin base, wherein the particles increase an impact resistance of the composite resin compared to the resin base without the particles.

2. The electronic device of claim 1, wherein the housing comprises at least one of metal, ceramic, glass, and carbon fiber.

3. The electronic device of claim 1, wherein the particles comprise a ceramic material.

4. The electronic device of claim 1, wherein the particles are nano-sized particles.

5. The electronic device of claim 1, wherein the particles comprise rubberized particles.

6. The electronic device of claim 1, wherein the particles are substantially evenly distributed within the composite resin.

7. The electronic device of claim 1, wherein a concentration of particles is greater at areas of the composite resin proximate the retaining surface compared to remainder areas of the composite resin.

8. The electronic device of claim 1, wherein a concentration of particles is lesser at areas of the composite resin proximate the retaining surface compared to remainder areas of the composite resin.

9. The electronic device of claim 1, wherein the retention feature is a groove formed along the retaining surface.

10. The electronic device of claim 1, wherein the composite resin is substantially resistant to physical deformation at temperatures up to about 130° C.

11. The electronic device of claim 1, wherein the composite resin is resistant to discoloration when exposed to an electrolytic solution during a subsequent anodizing process.

12. The electronic device of claim 1, wherein resin base is comprised of at least one of an acrylate-based resin, an anhydride-based resin, a cationic-based resin, and a thermosetting polymer.

13. A method for forming a housing for an electronic device, the method comprising:
    forming a cavity within the housing, the cavity defined by a retaining surface having at least one retention feature;
    molding a composite resin while in an uncured state within the cavity, wherein during the molding at least one securing feature of the composite resin forms within corresponding at least one retention feature, wherein the composite resin comprises a plurality of discrete particles suspended within a resin base; and
    forming a radio frequency (RF) transparent window by curing the composite resin within the cavity such that the at least one securing feature engages with the retention feature securing the RF transparent window within the cavity, wherein the RF transparent window allows transmission of RF wavelengths to pass therethrough, and wherein the particles increase an impact resistance of the RF transparent window compared to the cured resin base alone; and
    co-finishing the housing with the RF transparent window such that an interface between the housing and the RF transparent window is substantially seamless in appearance.

14. The method of claim 13, further comprising:
    prior to molding the composite resin, selecting materials for the composite resin.

15. The method of claim 14, where the selecting comprises:
    determining a temperature resistance of a group of proposed materials for the resin base once the proposed materials are cured; and
    selecting a material for the resin base with a high temperature resistance to physical deformation.

16. The method of claim 15, wherein the resin base is substantially resistant to physical deformation at temperatures up to about 130° C.

17. The method of claim 14, where the selecting comprises:
    determining an optical opacity of a cured form of a group of proposed material for the resin base;
    determining an optical opacity of a group of proposed particle materials; and
    selecting a resin base material and a particle material based on the determination.

18. A method for forming a housing for a consumer electronic product, the housing having a cavity defined by a retaining surface, the retaining surface having at least one retention feature, method comprising:
    injecting an uncured composite resin within the cavity, wherein during the forming at least one securing feature of the composite resin forms within corresponding at least one retention feature of the retention surface, wherein the uncured composite resin comprises a plurality of particles suspended within a resin base;
    forming a radio frequency (RF) transparent window by curing the composite resin within the cavity such that the at least one securing feature engages with the retention feature securing the RF transparent window within the cavity, wherein the RF transparent window allows transmission of radio frequency (RF) wavelengths to pass therethrough, and wherein the particles increase an impact resistance of the RF transparent window compared to the cured resin base alone; and co-finishing the housing and the RF transparent window forming a seamlessly appearing transition between the housing and the RF transparent window.

19. The method of claim 18, wherein co-finishing the housing and the RF transparent window comprises mechanical finishing an outer surface of the housing and an outer surface of the RF transparent window in a single finishing operation.

20. The method of claim 19, wherein the mechanical finishing comprises at least one of milling, drilling, sand blasting, and bead blasting surfaces of the RF transparent window and the housing.

21. The method of claim 18, wherein co-finishing the housing and the RF transparent window comprises:

passivation of the housing and the RF transparent window.

22. The method of claim 21, wherein passivation comprises an anodizing process.

23. The method of claim 22, wherein the anodizing process includes applying an anodizing chemistry to surfaces of the housing and the RF transparent window to promote growth of a thin oxide passivation layer on surfaces the housing, wherein the RF transparent window retains an original color before and after the anodizing.

* * * * *

UNITED STATES PATENT AND TRADEMARK OFFICE
CERTIFICATE OF CORRECTION

| | | |
|---|---|---|
| PATENT NO. | : 8,994,608 B2 | Page 1 of 1 |
| APPLICATION NO. | : 13/620142 | |
| DATED | : March 31, 2015 | |
| INVENTOR(S) | : Peter N. Russell-Clarke et al. | |

It is certified that error appears in the above-identified patent and that said Letters Patent is hereby corrected as shown below:

In the Claims

Column 8, line 58 (Claim 18, line 8): "retention surface," should read -- retaining surface, --.

Signed and Sealed this
Seventh Day of July, 2015

Michelle K. Lee
*Director of the United States Patent and Trademark Office*